(12) United States Patent
Melikian et al.

(10) Patent No.: US 6,477,275 B1
(45) Date of Patent: Nov. 5, 2002

(54) SYSTEMS AND METHODS FOR LOCATING A PATTERN IN AN IMAGE

(75) Inventors: Simon H. Melikian, Bedford, MA (US); Rohit G. Israni, Bedford, MA (US)

(73) Assignee: Coreco Imaging, Inc., Bedford, MA (US)

( * ) Notice: Subject to any disclaimer, the term of this patent is extended or adjusted under 35 U.S.C. 154(b) by 0 days.

(21) Appl. No.: 09/333,701

(22) Filed: Jun. 16, 1999

(51) Int. Cl.⁷ .............................. G06K 9/00; G06K 9/64; G06K 9/68; G06K 5/00; H04N 7/18
(52) U.S. Cl. ..................... 382/217; 382/103; 382/115; 382/173; 382/149; 382/181; 382/209; 382/218; 235/380; 348/129; 348/169
(58) Field of Search .................... 382/103, 112, 382/115, 119, 124, 141, 145, 147, 149, 159, 170, 173, 181, 209, 217, 219, 224, 225, 278, 309, 218; 235/380; 348/86, 91, 92, 125, 129, 130, 169; 902/25, 26, 28

(56) References Cited

U.S. PATENT DOCUMENTS

| | | | | |
|---|---|---|---|---|
| 5,347,595 A | * | 9/1994 | Bokser | 382/225 |
| 5,627,915 A | * | 5/1997 | Rosser et al. | 382/219 |
| 5,694,482 A | * | 12/1997 | Maali et al. | 382/151 |
| 5,696,838 A | | 12/1997 | Chiu et al. | 382/159 |
| 5,774,582 A | * | 6/1998 | Gat et al. | 382/186 |
| 5,790,702 A | * | 8/1998 | Yoshimura | 382/209 |
| 5,859,923 A | * | 1/1999 | Petry, III et al. | 382/141 |
| 5,867,609 A | | 2/1999 | Shamoon et al. | 382/278 |
| 5,912,980 A | * | 6/1999 | Hunke | 382/103 |
| 5,917,935 A | * | 6/1999 | Hawthorne et al. | 382/149 |
| 5,917,962 A | * | 6/1999 | Chen et al. | 382/291 |
| 5,995,652 A | * | 11/1999 | Chiu et al. | 382/159 |
| 6,005,978 A | * | 12/1999 | Garakani | 382/218 |
| 6,026,397 A | * | 2/2000 | Sheppard | 707/5 |
| 6,320,977 B1 | * | 11/2001 | Tokura | 382/151 |

FOREIGN PATENT DOCUMENTS

DE 37 40 066 C1 3/1989

* cited by examiner

*Primary Examiner*—Leo Boudreau
*Assistant Examiner*—Daniel G. Mariam
(74) *Attorney, Agent, or Firm*—Foley Hoag LLP (57) ABSTRACT

In one aspect the invention provides processes for locating a pattern within an image that can comprise the acts of providing a template representative of the pattern to be located within an image. The image can be subdivided into a plurality of sub-images, each being representative of a portion of the image. The process can then compare each of the sub-images to the template to generate a plurality of score signals representative of a location of the pattern, and can then process the score signals to determine a location for the pattern. In one practice, the step of processing the score signals can include a step of identifying at least one sub-image that includes a degraded image. As described above, a degraded image can include an image that has had a portion obscured by shadows or debris. Additionally, an image can be degraded at spots of high-reflection that create glare and wash-out portions of the image.

3 Claims, 4 Drawing Sheets

SYSTEMS AND METHODS FOR LOCATING A PATTERN IN AN IMAGE

FIELD OF THE INVENTION

The invention relates to systems and methods for computer imaging, and more particularly to systems and methods for locating the position of an image having a degraded or eroded portion.

BACKGROUND OF THE INVENTION

Machine vision systems exist today that can allow for the automation of many manufacturing tasks, such as product assembly and inspection. To this end, machine vision systems typically include a camera that can be disposed above a workpiece, such as a computer board being assembled or an item being inspected. The camera can connect to a frame grabber board that can be incorporated into a computer workstation. Under the control of software operating on the computer, the camera can capture images of the workpiece and the frame grabber board can generate image frames, each of which can be stored as a computer file that can be processed by the software running on the computer workstation. The software operating on the computer workstation can analyze the image files to identify and locate within the image patterns that are known to the system. In this way, the machine vision system can determine the presence or absence of particular items within the image as well as the location of those items. This information can be provided to a manufacturing device, such as a solder tool, to allow the manufacturing device to perform its function such as by further assembling components to a computer board.

Although machine vision systems work quite well, challenges still remain. For example, the quality of images generated by a camera depends in part on conditions that can vary uncontrollably in the manufacturing environment. For example, the quality of an image generated by a camera turns in part on the quality of background lighting. However, in the manufacturing environment the background lighting can change constantly. This in turn can result in differences between image frames collected by the machine vision system. In particular, dark spots and reflective spots within the image can vary from frame to frame, thereby making it difficult to recognize or locate a known pattern within the image. For example, during a metal processing step, a solder joint can be polished to a highly reflective finish. Under some lighting conditions, the solder joint can appear as a solid brightly lit ball. However, under other conditions shadows can appear on the solder joint causing an image to form that looks like a partially clouded ball. For either image, the machine vision system is provided with the challenge of identifying the solder joint ball within the image. However, the differences between images can make it difficult for the machine vision system to recognize or locate the degraded solder joint image.

Additional problems arise in the manufacturing environment wherein debris, such as dust, can land on a workpiece being imaged and processed. Accordingly, portions of the items that are to be recognized by the machine vision system can be obscured or clouded, thereby making recognition difficult. Still other problems arise from changes in reflectance. For example, during a manufacturing process that sequentially deposits different materials onto a substrate surface, the reflectance of the surface can change significantly. These changes in reflectance can obscure portions of the surface, making recognitition difficult.

In any case, the difficulty of recognizing degraded and decomposed images arises in part from the fact that the machine vision system is performing a pattern identification process wherein an image frame is searched to identify a known pattern within the image. The search process employs a pattern matching process wherein templates stored within the machine vision system are applied to portions of the image until a match between a template and a portion of the image can be found. A match is understood to represent the identification of a known item within the image. However, in those cases where the image includes degraded portions, the pattern matching process can fail as the image fails to contain an item that can confidently be matched to the correct template stored within the machine vision system. Additionally, even if the pattern can be found in the image, the exact location of the pattern may be difficult to determine, as the degraded image information may interfere with the exact measurement of the image position.

Accordingly, there is a need in the art for improved systems for being able to identify and locate patterns in an image that includes degraded or decomposed portions.

SUMMARY OF THE INVENTION

The systems and methods described herein are directed to machine vision systems that provide location systems that can locate with sub-pixel accuracy objects or fiducial patterns in an image, even when the objects vary in size, orientation, shape, occlusion, and appearance. To this end, the machine vision systems described herein can employ an artificial intelligence based technique to locate a pattern within the image to a very high accuracy. In one practice, a technique is employed wherein an image is subdivided into a plurality of sub-images. Each of the sub-images is compared to a portion of a template image and a measure of the similarity between the sub-image and the portion of the template is generated. For example, in one process on a pixel-by-pixel basis the system compares the sub-image to a portion of the template. The system then determines which portion of the sub-image is most representative of a particular characteristic of the template, such as which portion of the sub-image is most likely to represent an outside edge of the object being located. Once the portion of the sub-image that is most likely to be representative of the outside edge is determined, a calculation can be performed to determine where the center of the object would be given the location of the edge and the sub-image. For each sub-image this process can be determined with the results being an array of measurements each being representative of a reference point or points, such as the center of the object, as determined by the portion of the object displayed in the sub-image. In a subsequent step, the systems sort through the values in the array to identify those sub-images that yielded values that deviated substantially from the normal value. These sub-images are deemed to include degraded or obstructed views of the object. Conversely, sub-images that yield similar values for the center of the object can be understood as containing trustworthy data. The system can then employ the trustworthy measures of the center of the object to determine more exactly the object center.

More specifically, in one aspect the invention provides processes for locating a pattern within an image that can comprise the acts of providing a template representative of the pattern to be located within an image. The image can be subdivided into a plurality of sub-images, each being representative of a portion of the image. The process can then compare each of the sub-images to the template to generate a plurality of score signals representative of a location, or candidate locations, of the pattern, and can then process these score signals to determine a final measure of location for the pattern. This final measure can be deemed a more accurate representation of the pattern's location. In one practice, the step of processing the score signals can include a step of identifying at least one sub-image that includes a degraded image. As described above, a degraded image can include an image that has had a portion obscured by shadows or debris. Additionally, an image can be degraded at spots of high-reflection that create glare and wash-out portions of the image. Those of ordinary skill will know of other factors that can also degrade an image and these factors can also be addressed by the systems described herein.

To process the score signals, the system described herein, in one practice, apply an artificial intelligence grouping process that sorts the score signals into groups. One particular example of such a grouping process is a clustering process wherein the clustering process sorts the score signals into clusters and sorts the clusters to identify at least one cluster representative of sub-images having location information suitable for use in determining the location of the pattern. Other sorting and analytical techniques suitable for processing the score signals can be practiced with the invention without departing from the scope thereof Various implementations of the processes can be achieved, including those in which the step of comparing the sub-images to the template includes a step of processing the sub-images to generate a reference point signal that can be representative of the location of the center of the pattern. Optionally, the reference point signal can be determined to sub-pixel accuracy. For example, in one practice the center location is determined first to within one pixel location. Then the signal intensity values surrounding that identified pixel are fit to a surface, such as a parabola, to provide a sub-pixel level estimate of the center location. The step of subdividing the image can include a step of subdividing the image into a user-selected number of sub-images. Alternatively, an artificial intelligence process can be employed to determine a pattern of sub-images that can be generated from the image, wherein the pattern applied is understood to produce optimal or acceptable results for a subsequent pattern location process.

In a further aspect, the invention includes systems for locating a pattern within an image. These systems can comprise a data memory having storage for a template representative of the pattern; an image processor for subdividing the image into a plurality of sub-images, each being representative of a portion of the image; a comparator for comparing a plurality of the sub-images to the template to generate a plurality of score signals each being representative of a location for the pattern, and a locator for processing the score signals to determine a location for the pattern. The comparator can include a score filter mechanism for processing the score signals to identify any of the sub-images that include degraded image data. To this end, the systems can include a data processor that can apply an artificial intelligence grouping process to the score signals for sorting the score signals. One such processor can be a clustering processor for sorting the score signals into clusters and sorting the clusters to identify at least one cluster representative of sub-images having location information suitable for use in determining the location of the pattern.

The systems can also include an image processing means for processing a sub image to generate a center signal representative of a location of the center of the pattern. Additionally, the systems can include a sub-pixel location processor for processing signals, such as intensity signals, to generate a location signal representative of a location occurring between centers of two or more pixels in the image and representative of the location of the pattern. In one example, the system includes a processor for determining with sub-pixel accuracy the location signal. To subdivide the image, the system can provide a user interface for collecting criteria from a user that is representative of an instruction for subdividing the image into a plurality of sub-images. Alternatively, the system can include a subdividing mechanism for applying an artificial intelligence process to determine a pattern of sub-images to be generated from the image.

In a further aspect, the invention can be understood as a process or a system that determines a location of a pattern within an image signal that is comprised of a plurality of pixels. For example, such a system can comprise an image processor for subdividing the image signal into a plurality of sub-images each being representative of a portion of the image signal. A filter processor can be employed for processing the sub-images to filter out sub-images that fail to contain information representative of the location of the pattern within the image signal. A locator can be employed for processing sub-images that have information representative of the location of the pattern within the image. The locator can include a sub-pixel location processor capable of processing a plurality of signals representative of likely locations of the pattern. This allows the system to generate a location signal representative of a location that occurs between two or more pixels in the image and that is representative of the location of the pattern, or that can be understood to be representative of the location of the item that corresponds to the pattern in the image.

Additionally, it will be understood that the invention can be realized as computer programs that can be embodied in computer readable medium having stored thereon instructions for controlling a data processing system to implement a process according to the invention. One such process can comprise the steps of accessing a template representative of a pattern to be identified within an image, subdividing a signal representative of the image into a plurality of sub-images, each being representative of a portion of the image, comparing each of the sub-images to the template to generate a plurality of score signals representative of a location for the pattern, and processing the score signals to determine a location of the pattern within the image.

Other embodiments and practices of the invention will be understood from a review of the exemplary systems and methods illustrated herein.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

To provide an overall understanding of the invention, certain illustrative embodiments will now be described, including a system for searching through an image to locate a selected pattern therein. However, it will be understood by one of ordinary skill in the art that the search and locate systems described herein can be adapted and modified to provide image reconstruction systems, image recognition systems, or for any other suitable application. Moreover, it will be recognized that additions and modifications can be made to the systems and methods described herein without departing from the scope of the invention.

Figure 1:
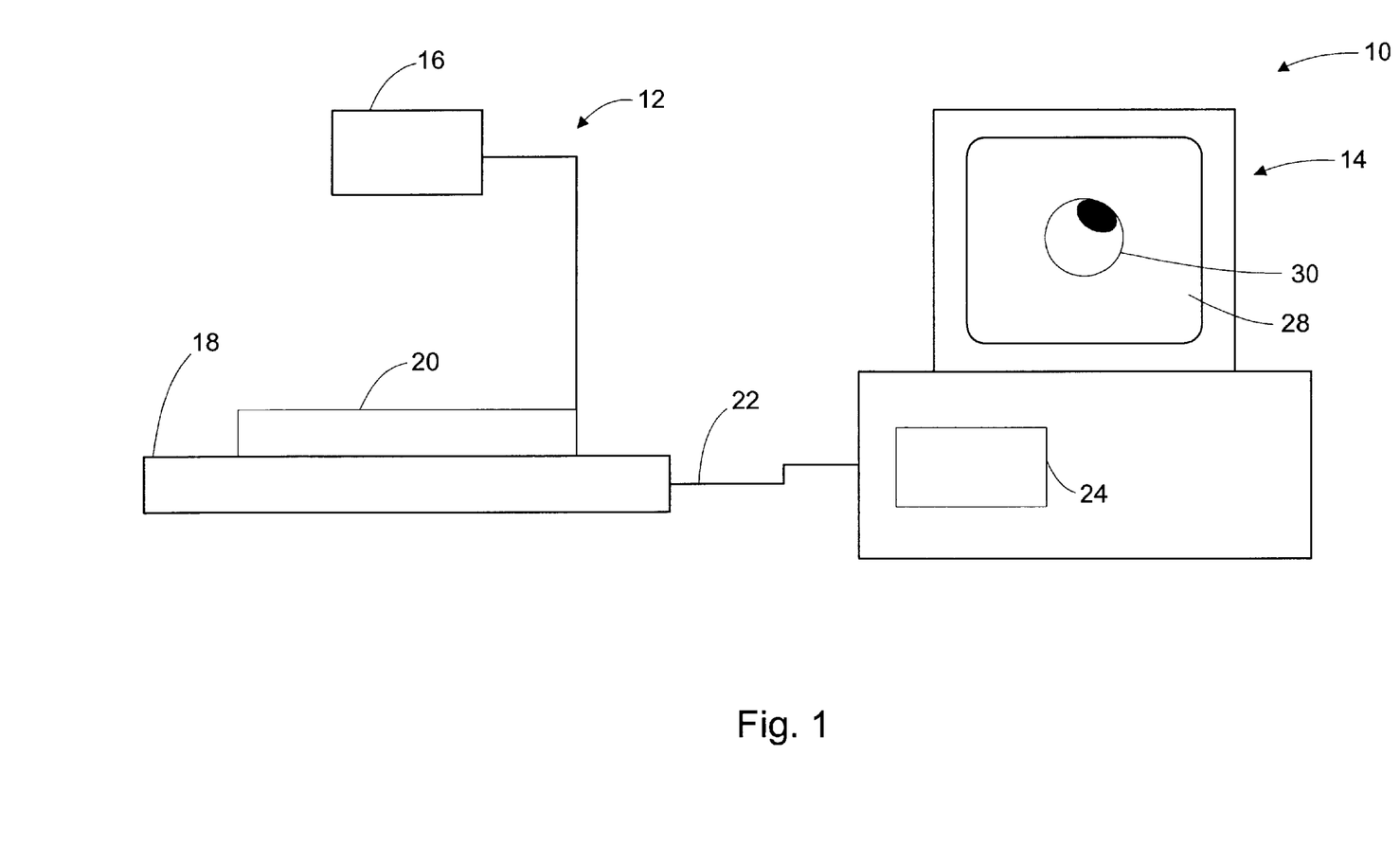
FIG. 1 depicts a system according to the invention for locating a pattern within an image.

FIG. 1 depicts a first system 10 for determining the position of a pattern within an image. Specifically, FIG. 1 depicts a system 10 that includes an image capture system 12 and a data processing unit 14. The image capture system 12 includes a camera element 16 and a work table 18 on which a work piece 20 sits. The image capture system 12 couples by the data path 22 to the data processing system 14. The data processing system 14 includes a frame grabber card 24 for capturing images provided by the image capture system 12, and further includes a display element 28 that can display an image, such as the depicted image 30, which can be representative of the image captured by the image capture system 12. It will be recognized by those of ordinary skill in the art that the imaging system 12 can be a conventional imaging system of the type commonly employed for industrial imaging applications. Thus, it will be understood that the invention provides systems and methods that can work on a wide variety of platforms and that a particular hardware platform is not required.

For example, the depicted camera 16 can be any suitable camera and the actual camera selected can vary to meet the criteria of the imaging application at hand. Suitable cameras are available commercially. The camera 16 can generate individual image frames as well as image frames that can be provided as a data stream to the data processing system 14. On-chip micro lenses can be present to increase sensitivity. Optionally, the camera can have its own built-in frame store which captures and outputs full-frame images in real time. The depicted camera 16 couples to the data processing system 14 via the depicted data path 22. Such a data path can be provided by the camera, such as an RS-422 digital signal output for interfacing with external image processing system, such as a commercial frame grabber.

The depicted data processing system 14 can be a conventional data processing platform such as an IBM PC-compatible computer running the Windows operating systems, or a Sun workstation running a Unix operating system. Alternatively, the data processing system 14 can comprise a dedicated processing system that includes an embedded programmable data processing system that can include a pattern location mechanism according to the invention. For example, the data processing system 14 can comprise a single board computer system that has been integrated with the image capture system for providing a stand alone system for pattern location. The data processing platform can be programmed, such as in the C or C++ programming languages, to operate as a system according to the invention.

The depicted data processing system 14 includes a frame grabber card 24 of the type commonly employed for capturing frames of image data and for providing the captured frames to a host processor system for image analysis. One example of a suitable frame grabber card is the PCVision image capture card manufactured and sold by Imaging Technologies Inc. of Bedford Mass. The system can be applied to automated imaging and machine vision applications. The PCVision is a half-slot PCI bus card that handles video formats of RS-170 CCIR and progressive scan VGA cameras. Strobe and trigger are supported as well. The PCVision has 2MB of on board VRAM for buffering image data between the camera and the host PC, and can provide simultaneous acquisition and processing of data.

Optionally, the systems described herein can employ dedicated image processing systems with DSP capability. Such systems provide for image analysis operations within dedicated hardware, often providing greater speed of analysis. Accordingly, it will be understood by those of ordinary skill in the art that in some embodiments, real time operation of the pattern location systems described herein can be provided through dedicated processing systems. Such dedicated image processing systems can be developed from commercially available programmable image processing systems, such as the IM-PCI system, manufactured and sold by Imaging Technologies, Inc. of Bedford Mass. The IM-PCI system provides a modular architecture with an application software development environment. The IM-PCI is a modular pipeline vision processor that provides sophisticated real-time image processing and analysis capabilities. The LM-PCI can process a 512×512 image through a computational algorithm in less than 7.5 msec., and, 1k×1k images can be processed in under 30 msec. Such dedicated image processing systems can be supported by a PC host system, to allow for input/output operations and for providing a convenient layer for application development. For example the IM-PCI system is a single slot Image Manager motherboard and includes the primary image memory, system timing controls, and is the principal data interface to the host CPU. The IM-PCI accepts various plug-on mezzanine modules for camera interface, computational acceleration and display functions.

To exploit the high speed processing power of the IM-PCI, the systems described herein can include dedicated hardware devices that can accelerate computationally intensive processes. These computational modules can plug onto the IM-PCI and onto the optional computational module controllers (CMC). Such modules can connect to the IM-PCI and to other such modules through a video bus. Any mix and number of CMCs can be configured into the pipeline and used to build up a system with the desired performance and functionality. Other additions, modifications and substitutions can be made to the system 10 without departing from the scope of the invention.

Figure 2A:
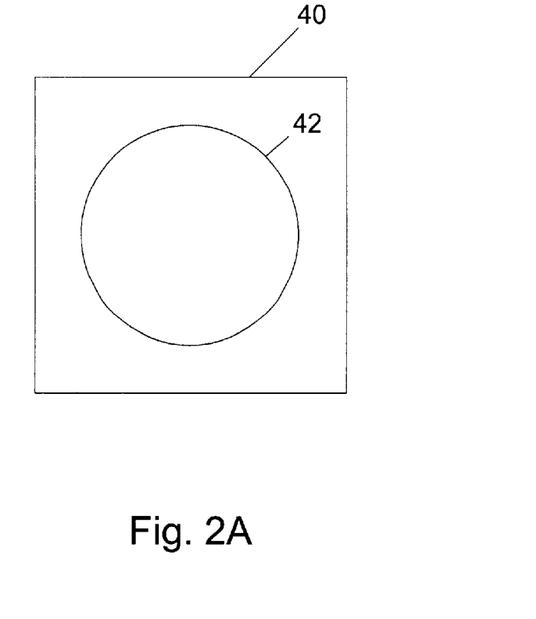
FIGS. 2A and 2B depict respectively and pictorially one example of an image and a degraded image of the type that can be captured by the system of FIG. 1.

FIGS. 2A and 2B depict pictorially examples of the types of images that can be captured by the system 10 depicted in FIG. 1. Specifically, FIG. 2A is meant to depict an image frame 40 that contains an image 42 that represents the image that the system expects to be captured during the imaging process. The image 42 can be an image of an object or a fiducial, or of anything that can be imaged by the system 12 depicted in FIG. 1. The depicted image frame 40 is comprised of pixels, each carrying information, such as gray-scale value, that can be employed for identifying a pattern, such as the image of the object 42, within the image frame 40.

Figure 2B:
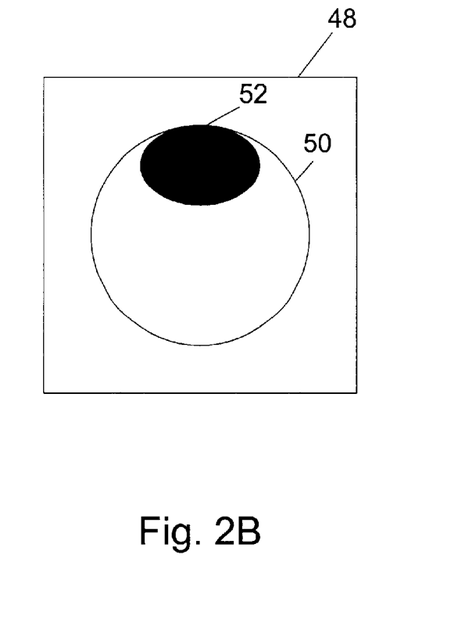

Similarly, FIG. 2B depicts an image frame 48 containing an image 50 that is meant to be the identical item represented by the image 42 in FIG. 2A. However, the image 50 in FIG. 2B includes a portion that is degraded, and differs from the image that the system 10 expects to be generated. Specifically, FIG. 2B depicts an image 50 that includes a portion 52 that has a significantly different gray scale image than the same portion as shown in FIG. 2A. This variation in gray scale can arise from variations in background lighting, such as by cast shadows, unexpected high reflectance, or from any other unexpected change in lighting. Additionally, degraded portions of the image 50 can arise from obscured portion of the item being imaged, such as obfuscation that can arise from dirt, dust, hair or any other matter than can interfere with the imaging process.

In either case, the system 10 applies to either of the images frames 40 and 48 a search and locate operation, the goal of which is to find the location of a specified pixel pattern within the image frame being processed. The system can apply a first search process that can be a conventional search process that calculates the correlation between the image and the pattern at each pixel position in the image. Such search processes take advantage of the fact that the items and fiducials imaged by the system 12 can have characteristic variations in gray scale across the surface of the image, characteristics surface irregularities such as gaps, an holes and any other type of characteristic that can be employed by the imaging system for identifying a pattern within an image. Typically, a pattern, also known as a template, is shifted over the image much like a convolution kernel. The pattern can be the expected representation of the image, such as the image that is typically returned when imaging a particular item. The pattern can be stored as a data file on the data processing system 14 depicted in FIG. 1.

As with most convolution operations, the correlation can be calculated in the spatial domain or in the frequency domain. One particular example of such an search process is the pattern matching algorithm called Normalized Grayscale Correlation (NGC). NGC starts with an image (pattern or template) as a learning model and then mathematically shifts the model by rows and columns around a new image until a correlation peak is found. The higher the intensity of the peak found, the better the match is deemed to be to the original pattern. In the end, the search process returns the x and y coordinates of where the pattern was found.

Alternatively, the system can employ a geometric search process that locates a pattern within an image by identifying certain geometric characteristics of the pattern within the image. Typically, such geometric search processes are based on relationships between pattern contours and reference points, however, any suitable technique can be employed. These and any other suitable location processes can be employed by the systems and methods described herein.

The image depicted in FIG. 2A is well suited for a search process such as the NGC process. As depicted in FIG. 2A, the image of the object 42 is clear and the defining edge sharply delineates the object. The pixel image also shows an edge that is continuous along the entire periphery of the object 42. Similarly, such a pattern can be located by a geometric search process. In contrast the image of the object 50, depicted pictorially in FIG. 2B includes a degraded portion 52 that presents pixel values that are substantially different from the values that are expected. FIG. 2b is poorly suited for location by a convolution method like the NGC process. Its principle is based on a correlation score, which indicates the confidence of the match to the pattern it has been taught. Template matching systems can fail when the image returned by the imaging system is degraded, obscured, obfuscated, or impaired in some way. These image decomposition can occur when there are changes in contrast and lighting, scale obliteration, rotation, and blur. Regardless of the cause of the degraded image quality, the result is that the machine vision system has difficulty in matching the captured image to the appropriate template. Moreover, even if a match can be made with some level of confidence, the degraded portion of the image interferes with the machine visions ability to locate with high accuracy the exact position of the item. Similar difficulties can arise with geometric search processes, that may rely on the quality of the peripheral edge of the imaged object. In FIG. 2B, however, that edge is degraded.

Figure 3:
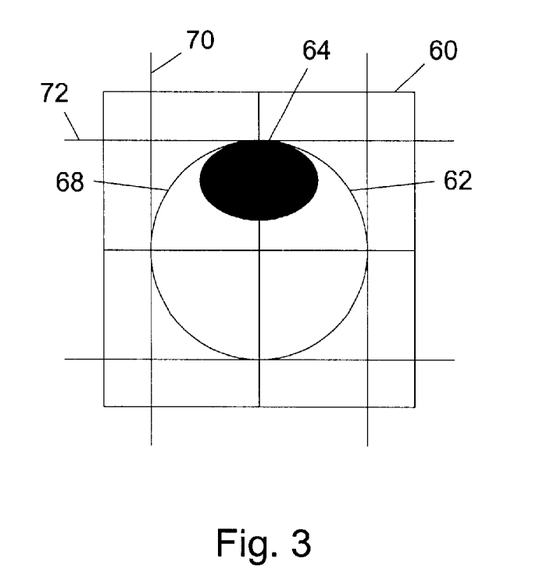
FIG. 3 depicts a degraded image having been subdivided into sub-images.

To improve the accuracy with which a degraded image can be located, the systems and methods described herein can apply a technique that removes the degraded image information from the image data being processed. To this end, these processes subdivide a captured image into a set of sub-images, and analyze each sub-image separately to determine whether each respective sub-image includes a portion of an image that can be matched to a corresponding portion of a template. One such sub-imaging process is graphically depicted in FIG. 3 wherein an image frame 60 is shown. Within the image frame 60 an image 62 of an item is portrayed. The image 62 includes a degraded portion 64. FIG. 3 further depicts that the image frame 60 is subdivided into a set of sub-images. In particular, FIG. 3 depicts that the image frame 60 is subdivided into 16 separate sub-images, graphically depicted by the axes 70 and 72 extending vertically and horizontally, respectively. The sub-images each capture a portion of the image frame 60 and can contain portions of the image 62, such as a portion of the edge 68 of the image 62, which can be matched to a portion of the template. The matching process can involve applying a pattern matching algorithm, such as the NGC or Geometric search process, to match the sub-image to the image template. As will be understood by those of ordinary skill in the art, the convolution process is a communative process that is generally indifferent to the order of operation. Accordingly, whether a template is matched to an image, or an image is matched to a template, the output of the operation is the same. Consequently, for a convolution process each sub-portion can be convolved with the template and the correlation between the template and sub-image can be monitored until the peak correlation is identified, where in the peak correlation can be understood to indicate the location of the sub-image within the template. This location information can be processed to determined those sub-images that contain degraded image data which can provide inaccurate information for determining the pattern within the image. The process can then sort through the image data to remove the degraded portion of the image data that can lead to an inaccurate determination of the location of the pattern within the image.

Figure 4:
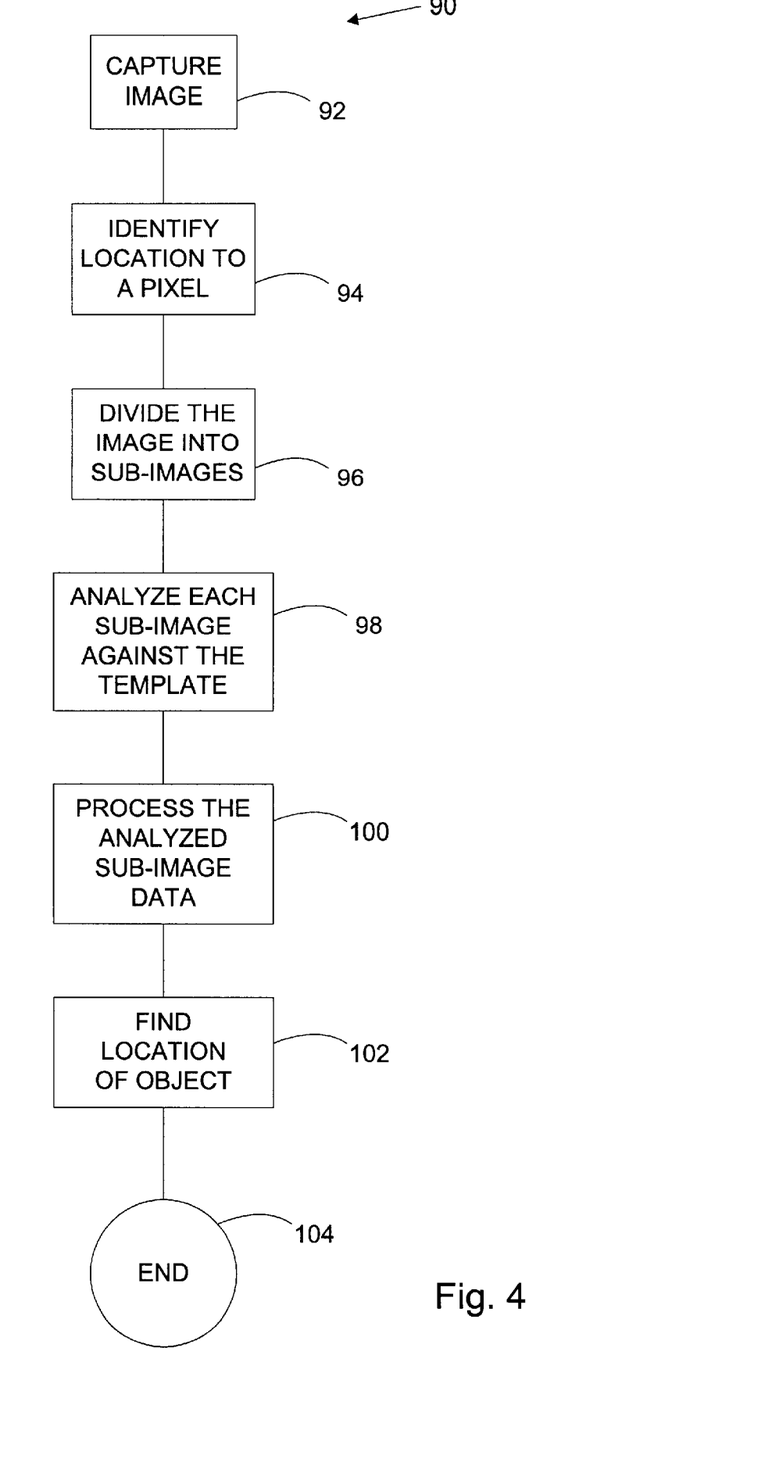
FIG. 4 depicts a flow chart of a process for identifying a degraded portion of an image.

FIG. 4 depicts a flow chart diagram of one process for analyzing a degrade image to determine the location of a pattern. Specifically, FIG. 4 depicts a process 90 that begins in a step 92 wherein an image of an item to be located is captured. Subsequent to capturing an image, the process 90 proceeds to step 94

At step 94, the system can determine, using for example, NGC or Geometric searching, a reference point, such as a center location of the pattern, to within one pixel of accuracy. The correlation value can be generated as the convolution takes place, with the highest peak being a representative of the greatest correlation between the image data of the sub-image and the image data of the template. In one practice, a predetermined threshold is provided which can represent a correlation level representative of a match between the sub-image and the template. For each sub-image, the point of highest correlation between the sub-image and the template is identified. For that point of correlation, a reference point, such as the center of the item, can be determined and identified. This reference point is identified to within one pixel value. The process can continue and for each sub-image a reference point, such as a center location, for each sub-image can be deemed and is generated. Optionally, the process can perform a process that will determine with sub-pixel accuracy the location of the reference point being identified. In one practice, the reference point identified is the highest intensity value located during the convolution or geometric search process. This information is provided with pixel accuracy.

To achieve sub-pixel accuracy, the signal intensity values, or correlation signal intensity values, of the neighboring pixels to the identified pixel location can be fit to a surface, such as a parabolic surface. Once the parabolic surface is determined, the apex of the parabolic surface can be identified and it's pixel location found. Thus, by fitting the pixel with the highest intensity value to a parabolic surface, along with it's neighboring pixel values, such as the eight pixel value that can surround one pixel location, the actual location of the reference point can be determined with sub-pixel accuracy. This sub-pixel location process can be performed for each of the sub images so that a measure of a reference point can be found as a function of the data provided by each subimage. The locations of the reference points identified for each subimage can be stored in an array wherein the index of the array corresponds to the subimage that provided the data in that location of the array.

After step 94, the process 90 begins step 96, wherein the image is subdivided into a plurality of sub-images. In this step, the user can select a number of sub-images into which to divided the overall image. For example, the user can choose to subdivide the image into sixteen sub-images by employing a 4×4 matrix that can be place over on the captured image. In selecting the number of sub-images to create from the captured image, the user can consider the geometry of the item being identified, whether the item contains defining characteristics that may be grouped together into a single sub-image, or any other suitable characteristic. In an alternative practice, the processes described herein can automatically determine the number of sub-images and optionally, the pattern of sub-images that should be divided out of the image. For example, in one practice the system employs an artificial intelligence process to determine the number of sub-images that is most likely to yield the location of the item with a high degree of accuracy. In still further optional practices, the systems can choose to have a predetermined number of sub-images to which each image is always to be divided. It will be apparent to those of ordinary skill in the art that other systems and techniques can be employed for subdividing the image into a plurality of sub-images, and such modifications to the processes and systems described herein are not understood to depart from the scope of the invention.

Proceeding from step 96, the process 90 performs step 98 wherein the sub-images that fail to match to the template are identified. In one process, the system employs an artificial intelligence clustering algorithm that sorts through characteristics of the sub-images to identify those sub-images that are most likely to contain degraded portions of the image. More specifically, the clustering process operates by sorting through the array generated and step 96, wherein each entry in the array can be representative of a center location determined for the pattern. More specifically, the clustering array operates by sorting through the determined center locations for the image and grouping together similar values into a cluster, such that when the clustering process is complete all the estimated center locations are clustered together into a plurality of clusters. The process 90 then identifies in step 100 whether one particular cluster contains sufficient center determinations to indicate that the sub-images associated with these center locations are likely to provide accurate data as to the location of the pattern within the image. Accordingly, by step 100 the process 90 has determined those sub-images that fail to match with the template and those sub-images which match sufficiently with the template to provide an accurate measure of the location of the pattern within the image.

After step 100, the process 90 proceeds to step 102. In step 102, the process 90 can take the reference point locations provided in the largest cluster and process these multiple values to generate one single value that is aimed to be representative of the location of the reference point. For example, if the selected cluster includes four measures of the location of the reference point, the system in step 102 can take the average of these four values as being representative of the actual location of the reference points. In other processes, other techniques can be employed for processing the values within the clusters to determine the location of the reference point, and any suitable technique can be practiced herewith without departing from the scope of the invention. After step 102, the process 90 proceeds to step 104 and terminates.

Figure 5:
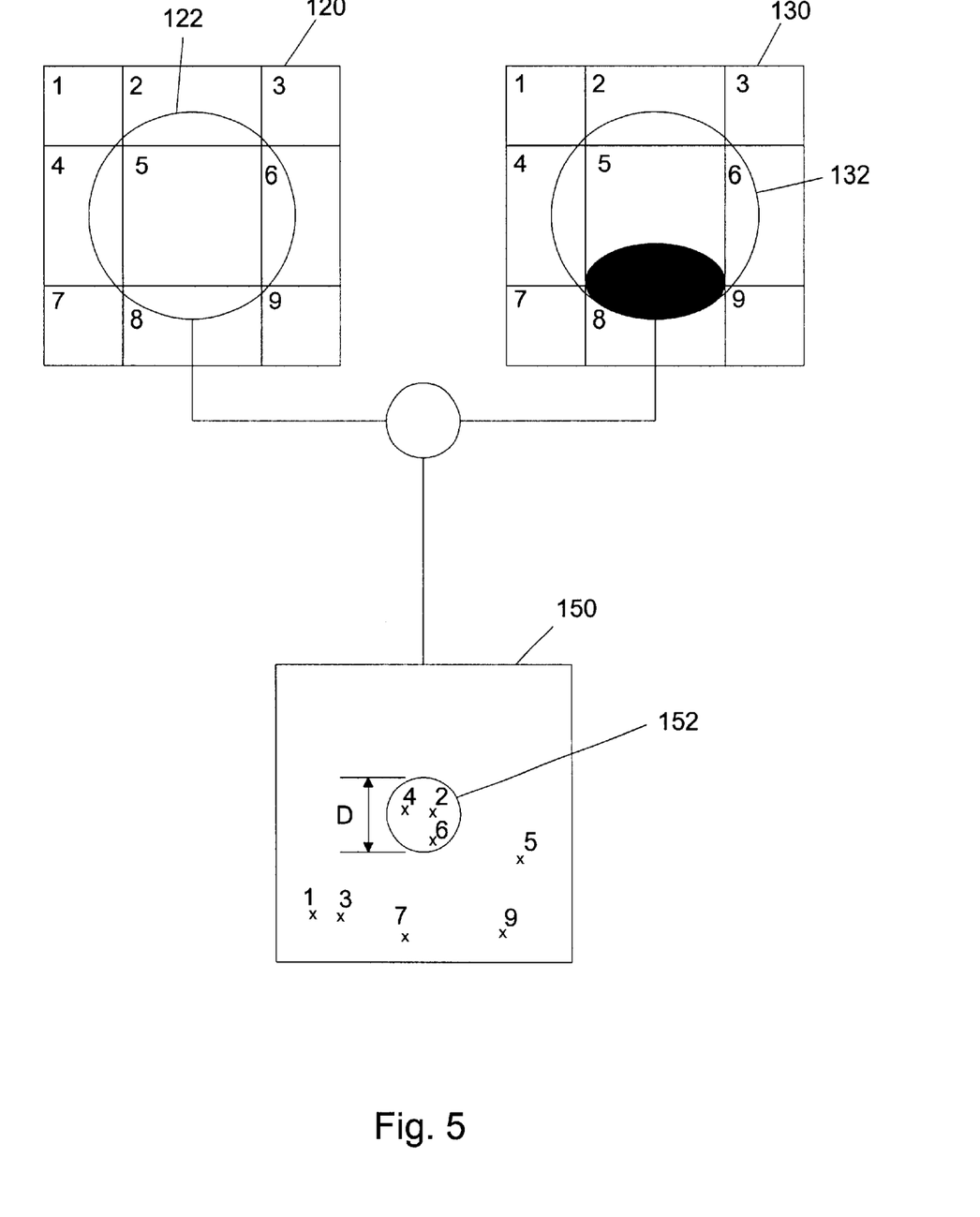
FIG. 5 depicts graphically the flow of data during a process such as that depicted by FIG. 4.

Turning now to FIG. 5, an illustration that represents the data flow that occurs during the processes of the invention can be seen. Specifically, FIG. 5 depicts a template 120 that includes a pattern 122 therein. FIG. 5 further depicts an image 130 that has a pattern 132 therein. In a process according to the invention, the pattern 132 can be identified within the image 130 by applying the template 122 to the image data in the image frame 130. To this end, the image can be subdivided into a group of sub-images. In FIG. 5 the image 130 is shown as being subdivided into nine subimages. These nine subimages can be compared against information in the template and measures of the location of a reference point, such as the center of the pattern 132, within the image 130 can be generated. This is shown pictorially by the image block 150. Specifically, the image block 150 depicts that the center locations determined for each of the subimages can be mapped to a location space. To represent this, a series of X marks are located within the image block 150. Each X mark indicates a candidate, or expected, location of the reference point as determined by comparing a respective one of the nine subimages to a template 120. The location of the reference point for each of the subimages can be mapped onto the image space 150. This is shown in FIG. 5 where the image space 150 includes X marks for the subimages 1, 2, 3, 4, 5, 6, 7 and 9. It will be noted that no reference locations was provided for subimage 8. The lack of a reference location for subimage 8 can arise from the fact that the data from the subimage 8 was deemed to be too untrustworthy to produce any results. It will be noted that subimage 8 includes the largest amount of degraded image data, and its measure of a reference point can be very inaccurate. By providing highly trustworthy data for providing any results, this prevents the unfortunate coincidence of having bad data mapped close to good data, which can confuse a clustering algorithm, causing the clustering algorithm to group good data with bad.

Once the reference locations for each of the subimages is mapped under the image space 150, the clustering algorithm can go through to determine the largest cluster. To this end, a cluster size can be set. This is represented by the diameter D of the center cluster circle 152. The cluster with the greatest number of members can be identified as the cluster having information suitable for determining the reference point, such as the center point. Once the largest cluster has been identified, the reference locations contained therein can be processed, such as by averaging, to come up with a single measure for the location of the reference point. Other techniques for sorting the generated data can also be provided.

The systems and methods described above are merely representative of those systems and methods can be provided by the invention, and are provided for purposes of illustration and are not to be limiting in any way. For example, the above system has been described with reference to a system that employs a clustering process for determining a set of data that can be employed for measuring the location of a pattern. However, other techniques can be applied, including standard statistical techniques that analyze data to determine the portion of the data that appears trustworthy. Such techniques can employ measures of standard deviation, numerical averages, mean, distance measures or any other technique. Additionally, the above techniques can be employed with any suitable system for determining with sub-pixel accuracy a measure of the location of a reference point.

Thus, it will be understood that the invention is not to be limited to the embodiments disclosed herein, but is to be understood from the following claims, which are to be interpreted as broadly as allowed under the law.

We claim:

1. A process for locating a pattern within an image, comprising:

providing a template representative of said pattern, subdividing said image into sub-images representative of a portion of said image, comparing each of said sub-images to said template to generate score signals representative of a location of said pattern determined as a function of a respective sub-image, fitting a plurality of signal intensity values to a surface for determining score signals, and processing said score signals to generate a location signal representative of a sub-pixel location signal to determine a location of said pattern.

2. A system for locating a pattern within an image, comprising:

a data memory having storage for a template representative of said pattern, a pattern recognition mechanism for determining a location of said pattern within one pixel;

an image processor for dividing said image into sub-images representative of a portion of said image, a comparator for comparing said sub-images to said template to generate score signals being representative of a location of said pattern, a locator for processing said score signals to determine a location for said pattern, and a processor for fitting a plurality of signal intensity values to a surface, for determining a sub-pixel location signal.

3. A process for determining the location of an object, comprising providing a template representative of said object, obtaining an image which contains at least a portion of said object, subdividing said image into sub-images representative of a portion of said image, comparing said sub-images to said template to generate score signals representative of an expected location of said object, fitting a plurality of signal intensity values to a surface for determining said score signals, and processing said score signals to determine the location of said object and to generate a location signal representative of a sub-pixel location signal.

* * * * *